(12) United States Patent
Higbee

(10) Patent No.: US 11,727,159 B2
(45) Date of Patent: Aug. 15, 2023

(54) MISSION-DRIVEN DESIGN METHODOLOGY FOR OPTICAL SYSTEMS

(71) Applicant: Lawrence Livermore National Security, LLC, Livermore, CA (US)

(72) Inventor: Shawn D. Higbee, Oakland, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 991 days.

(21) Appl. No.: 16/412,924

(22) Filed: May 15, 2019

(65) Prior Publication Data

US 2020/0364309 A1  Nov. 19, 2020

(51) Int. Cl.
*G06F 30/00* (2020.01)
*G02B 27/00* (2006.01)

(52) U.S. Cl.
CPC ......... *G06F 30/00* (2020.01); *G02B 27/0012* (2013.01)

(58) Field of Classification Search
CPC .......... G06F 30/00; G06F 30/20; G06F 30/27; G06F 2111/10; G06F 30/10; G06F 30/12; G06F 30/25; G06F 30/28; G06F 2111/00–2119/22; G02B 27/0012
See application file for complete search history.

(56) References Cited

FOREIGN PATENT DOCUMENTS

WO   WO2015089231   *   6/2015   ............. G06F 30/20

OTHER PUBLICATIONS

Agocs et al. "Optimizing optical systems with active components" Proc. SPIE 8450, Modern Technologies in Space- and Ground-based Telescopes and Instrumentation II, 84505F (Sep. 13, 2012); doi: 10.1117/12.925326 [retrieved on Feb. 21, 2022] (Year: 2012).*
Muller, M. "Modeling of the Structure-Optics-Interaction in Large Astronomical Telescopes" [Thesis] Lehrstuhl für Leichtbau, Technische Universitat Munchen [retrieved on Feb. 22, 2022] (Year: 2005).*
Andersen et al. "An integrated model of the European Extremely Large Telescope" Proc. SPIE 7017, Modeling, Systems Engineering, and Project Management for Astronomy III, 70170S (Jul. 9, 2008); doi: 10.1117/12.789025 [retrieved on Feb. 26, 2022] (Year: 2008).*

(Continued)

*Primary Examiner* — Rehana Perveen
*Assistant Examiner* — Alfred H B Wechselberger
(74) *Attorney, Agent, or Firm* — Perkins Coie LLP

(57) ABSTRACT

Disclosed are devices, systems and methods for a mission-driven design framework for optical systems. An exemplary method for improving the design of an optical system includes receive a first plurality of parameters indicative of performance requirements of the optical system, receive a second plurality of parameters representative of characteristics of one or more components in the optical system, generate a mathematical representation that combines the first plurality of parameters and the second plurality of parameters, perform a sensitivity analysis to obtain a ranking of parameters from the first plurality of parameters and the second plurality of parameters, select, based on the ranking of the parameters, at least one parameter that produces a largest change in the mathematical representation, and produce a constraint file comprising the at least one parameter for ingestion by a design tool to enable the design of the optical system.

14 Claims, 13 Drawing Sheets

(56) References Cited

OTHER PUBLICATIONS

Lieber, M. "Space-based optical system performance evaluation with integrated modeling tools" Proc. SPIE 5420, Modeling, Simulation, and Calibration of Space-based Systems, (Sep. 3, 2004); doi: 10.1117/12.55050 [retrieved Feb. 28, 2022] (Year: 2004).*
Weaver, O. "An Analytical Framework for Assessing the Effifficacy of Small Satellites in Performing Novel Imaging Missions" [Thesis] Rochester Institute of Technology, College of Science [retrieved on Feb. 28, 2022] (Year: 2015).*
Schuhmann et al. "Software for tolerance analysis of optical systems" Proc. SPIE 4093, Current Developments in Lens Design and Optical Systems Engineering, (Oct. 24, 2000); doi: 10.1117/12.405230 [retrieved on Feb. 26, 2022] (Year: 2000).*
Seo et al. "Investigation of Primary Mirror Segment's residual errors for the Thirty Meter Telescope" Proc. SPIE 7427, Optical Modeling and Performance Predictions IV, 74270F (Oct. 1, 2009); doi:10.1117/12.828046 [retrieved on Feb. 26, 2022] (Year: 2009).*
Dewell et al. "Dynamic Stability with the Disturbance-Free Payload Architecture as Applied to the Large UV/Optical/Infrared (LUVOIR) Mission" Proc. SPIE 10398, UV/Optical/IR Space Telescopes and Inst.: Innov. Tech. and Concepts VIII, 103980B; doi: 10.1117/12.2274287 [retrieved on Sep. 2, 2022] (Year: 2017).*
Cullimore et al. "Automated Multidisciplinary Optimization of a Space-based Telescope" SAE 2002-01-2445 [retrieved on Feb. 28, 2022] (Year: 2002).*
Howard et al. "Optical Modeling Activities for NASA's James Webb Space Telescope (JWST): V. Operational Alignment Updates" Proc. SPIE 7017, Modeling, Systems Engineering, and Project Management for Astronomy III, 70170X (Jul. 11, 2008); doi: 10.1117/12.790237 [retrieved on Feb. 26, 2022] (Year: 2008).*
Le Roux et al. "Simulation Fine D'Optique Adaptative a Tres Grand Champ Pour Des Grands Et Futurs Tres Grands Telescopes" [Thesis] University of Marseille (Year: 2012).*
Seo et al. "Investigation of primary mirror segment's residual errors for the Thirty Meter Telescope" Proc. SPIE 7427, Optical Modeling and Performance Predictions IV, 74270F; doi: 10.1117/12.828046 (Year: 2009).*
Howard et al. "Optical modeling activities for NASA's James Webb Space Telescope (JWST): Part V. Operational alignment updates" Proc. SPIE 7017, Modeling, Systems Engineering, and Project Management for Astronomy III, 70170X; doi: 10.1117/12.790237 (Year: 2008).*
Hasenauer, D. "Optical System Tolerancing A Key to Product Cost Reduction" [White paper] Synopsys. (Year: 2018).*
Lieber, M. "Space-based optical system performance evaluation with integrated modeling tools" Proc. SPIE 5420, Modeling, Simulation, and Calibration of Space-based Systems; doi: 10.1117/12.550505 (Year: 2004).*
Bigelow, B. "Simulation of Adaptive Optical Correction with Deformable Secondary Mirrors" [Proceedings] 1995 Technical Digest Series, vol. 23 (Year: 1995).*

* cited by examiner

FIG. 6

| Angular f | Optical OTF (602) | Pixel OTF (604) | Optical + Pixel OTF (612) | Velocity Smear OTF (606) | Optical + Pixel + Velocity Smear OTF (614) | ADCS Jitter OTF (608) | Optical + Pixel + ADCS Jitter OTF (616) |
|---|---|---|---|---|---|---|---|
| 0 | 1 | 1 | 1 | 1 | 1 | 1 | 1 |
| 4505.208 | 0.974846995 | 0.999991571 | 0.974770725 | 1 | 0.974770725 | 0.999915298 | 0.973944938 |
| 9010.417 | 0.950193581 | 0.999678863 | 0.949888439 | 1 | 0.949888439 | 0.996615837 | 0.946733861 |
| 13515.63 | 0.926028708 | 0.999277753 | 0.925359688 | 1 | 0.925359688 | 0.992401733 | 0.918322855 |
| 18020.83 | 0.902349184 | 0.998715825 | 0.901190409 | 1 | 0.901190409 | 0.986531907 | 0.889053093 |
| 22526.04 | 0.879143686 | 0.997993911 | 0.877386034 | 1 | 0.877386034 | 0.979135974 | 0.858992249 |
| 27031.25 | 0.856424781 | 0.997111998 | 0.853951425 | 1 | 0.853951425 | 0.969951582 | 0.828291536 |
| 31536.46 | 0.834169942 | 0.996070339 | 0.830890941 | 1 | 0.830890941 | 0.959324098 | 0.797093732 |
| 36041.67 | 0.812376561 | 0.994869236 | 0.808208449 | 1 | 0.808208449 | 0.947206226 | 0.765540374 |
| 40546.88 | 0.791041973 | 0.993509035 | 0.785907347 | 1 | 0.785907347 | 0.933657577 | 0.733768355 |
| 45052.08 | 0.770152467 | 0.991993013 | 0.763990259 | 1 | 0.763990259 | 0.918744178 | 0.701911937 |
| 49557.29 | 0.749722313 | 0.990311296 | 0.742460713 | 1 | 0.742460713 | 0.902537937 | 0.670203836 |
| 54062.5 | 0.729727776 | 0.988478077 | 0.721319858 | 1 | 0.721319858 | 0.885116066 | 0.638451796 |
| 58567.71 | 0.710167144 | 0.986485804 | 0.700569806 | 1 | 0.700569806 | 0.866556047 | 0.607096101 |
| 63072.92 | 0.691035752 | 0.984336923 | 0.680712006 | 1 | 0.680712006 | 0.846957106 | 0.576110392 |
| 67578.13 | 0.672328013 | 0.982031986 | 0.660247613 | 1 | 0.660247613 | 0.826395372 | 0.545625539 |
| 72083.33 | 0.654038452 | 0.979571656 | 0.640467753 | 1 | 0.640467753 | 0.804967184 | 0.515774387 |

MISSION-DRIVEN DESIGN METHODOLOGY FOR OPTICAL SYSTEMS

STATEMENT REGARDING FEDERALLY SPONSORED RESEARCH OR DEVELOPMENT

This invention was made with government support under Contract DE-AC52-07NA27344 awarded by U.S. Department of Energy. The government has certain rights in the invention.

TECHNICAL FIELD

This patent document is directed generally to optical systems, and more particularly to design of optical systems.

BACKGROUND

Optical design systems are used by scientists and engineers to design, test, and optimize a wide range of optical systems. For example, optical design systems can be used to design, test, and optimize the optical components in telescopes, binoculars, microscopes, projectors, and cameras for imaging, illumination and other applications.

SUMMARY

Disclosed are devices, systems and methods for a mission-driven design framework for optical systems. In an example, this may be achieved by accepting higher-level mission parameters, generating a mathematical model that includes the mission parameters, and enabling a sensitivity analysis for the mission parameters to facilitate the construction of the optical system.

In one aspect, the disclosed technology may be used to provide a method for improving the design of optical systems. This method includes receive a first plurality of parameters indicative of performance requirements of the optical system, receive a second plurality of parameters representative of characteristics of one or more components in the optical system, generate a mathematical representation that combines the first plurality of parameters and the second plurality of parameters, perform a sensitivity analysis to obtain a ranking of parameters from the first plurality of parameters and the second plurality of parameters, where a change in a parameter with a higher rank produces a larger change in the mathematical representation than a parameter with a lower rank, select, based on the ranking of the parameters, at least one parameter that produces a largest change in the mathematical representation, and produce a constraint file comprising the at least one parameter for ingestion by a design tool to enable the design of the optical system.

The above and other aspects and features of the disclosed technology are described in greater detail in the drawings, the description and the claims.

BRIEF DESCRIPTION OF THE DRAWINGS

FIG. 6 is an example of a pre-computed table of optical transfer functions (OTFs).

DETAILED DESCRIPTION

Figure 1:
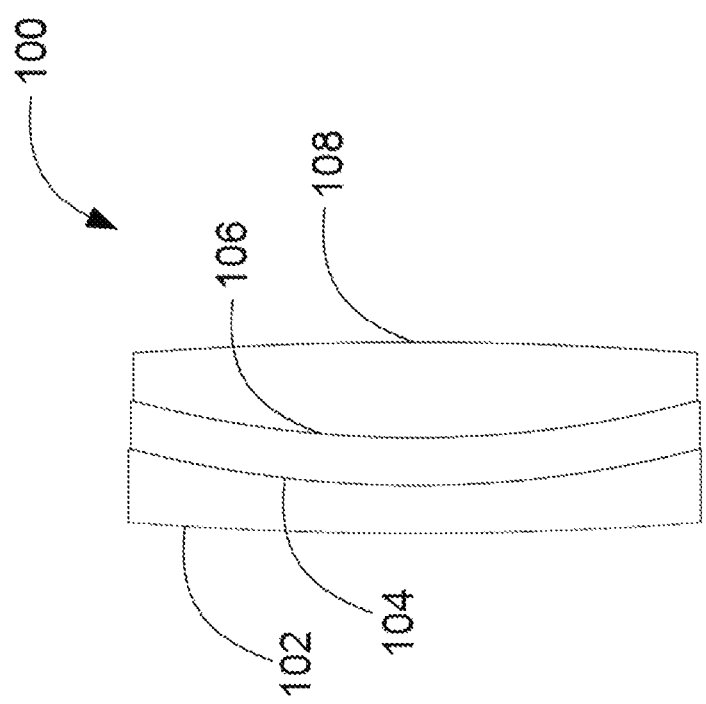
FIG. 1 illustrates a simple cemented triplet lens with four surfaces.

In this patent document, the word "exemplary" is used to mean serving as an example, instance, or illustration. Any embodiment or design described herein as "exemplary" is not necessarily to be construed as preferred or advantageous over other embodiments or systems. Rather, use of the word exemplary is intended to present concepts in a concrete manner.

Designing an optical system is complex and time consuming. The engineer needs to know that the optical system can meet mission needs before it is made, which is typically determined using various analytical methods to ascertain the performance or likelihood of failure, followed by one or more optimizations to change the product definition so as to maximize the product performance. Analysis, either by mathematical simulation or other methods such as benchmarking (comparison with similar products), is typically carried out in a computer program and the domain of computer-aided design has grown based on this intention.

Optical design systems use optimization algorithms to determine the most promising next candidate design with the smallest merit function. Optical design space is non-linear and with many local minima, so convergence is often slow and optimization routines may not find a global minimum, or even a good minimum. Run times for the optimization algorithms could be a few seconds for a simple lens to overnight, or longer, for more complex systems. Furthermore, a poor choice for the initial system may not converge at all. Thus, while current optical design algorithms may find several candidate solutions identified with several local minima, global optimization is often needed to find better solutions. However, global optimization with current optical design systems can be an impractical task in part because it can be a lengthy operation lasting several hours to several weeks or longer for more complex optical designs.

One difficulty in optimizing optical designs is that it is a numerically intensive process, which has been a longstanding problem in optical engineering. For example, with reference to simple triple lens 100 in FIG. 1, this optical component has four surfaces (102 through 108). In a brute force approach, designing such a lens can include trying all the possible systems and then selecting the best one. This process can take a very long time if all possible variables (e.g., surface curvatures, thicknesses, etc.) are tested. For example, suppose we select only eight variables that include radii of curvature and thicknesses, and run a few hundred or a thousand iterations for each variable using only a few rays at a few different wavelengths. One can compute the number of operations that are needed to perform such a brute-force design approach, which can reach thousands of years. There are obviously many optimization techniques that have been developed that can reduce the number of steps. However, the point of this example is to show that the design and optimization process for complex systems can be extremely computationally expensive.

Furthermore, in the simple example of FIG. 1, the four surfaces (102 through 108) are parameters associated with a specific optical component, and may not correspond to the high-level, or overall, mission objective. That is, in most practical applications, an optical system design is defined with regard to mission-driven parameters or objectives, rather than the parameters of the specific optical components used in the optical system design.

In some embodiments, the disclosed technology enables the optimization of an optical system, such as a telescope or spectrometer, for either airborne or spaceborne applications in a time-effective manner, and more specifically, the tuning of a mission-optimized set of design parameters (as compared to the parameters of the components), before the system is ever built.

In an example, this is achieved through the use of an optimization function in an image-utility metric space. Then a singular value decomposition is applied to the parameter mapping in order to define the utility trade associated with each design parameter in terms of the mission utility. This parameter set defines the framework for the optimization function that is applied in an optical design software package and is ultimately used to build a system that is pre-tuned to a given set of missions. These and other features and benefits of the disclosed embodiments are further described below.

Section headings are used in the present document to improve readability of the description and do not in any way limit the discussion or the embodiments (and/or implementations) to the respective sections only.

Overview of the Mission-Driven Design Methodology

Figure 2:
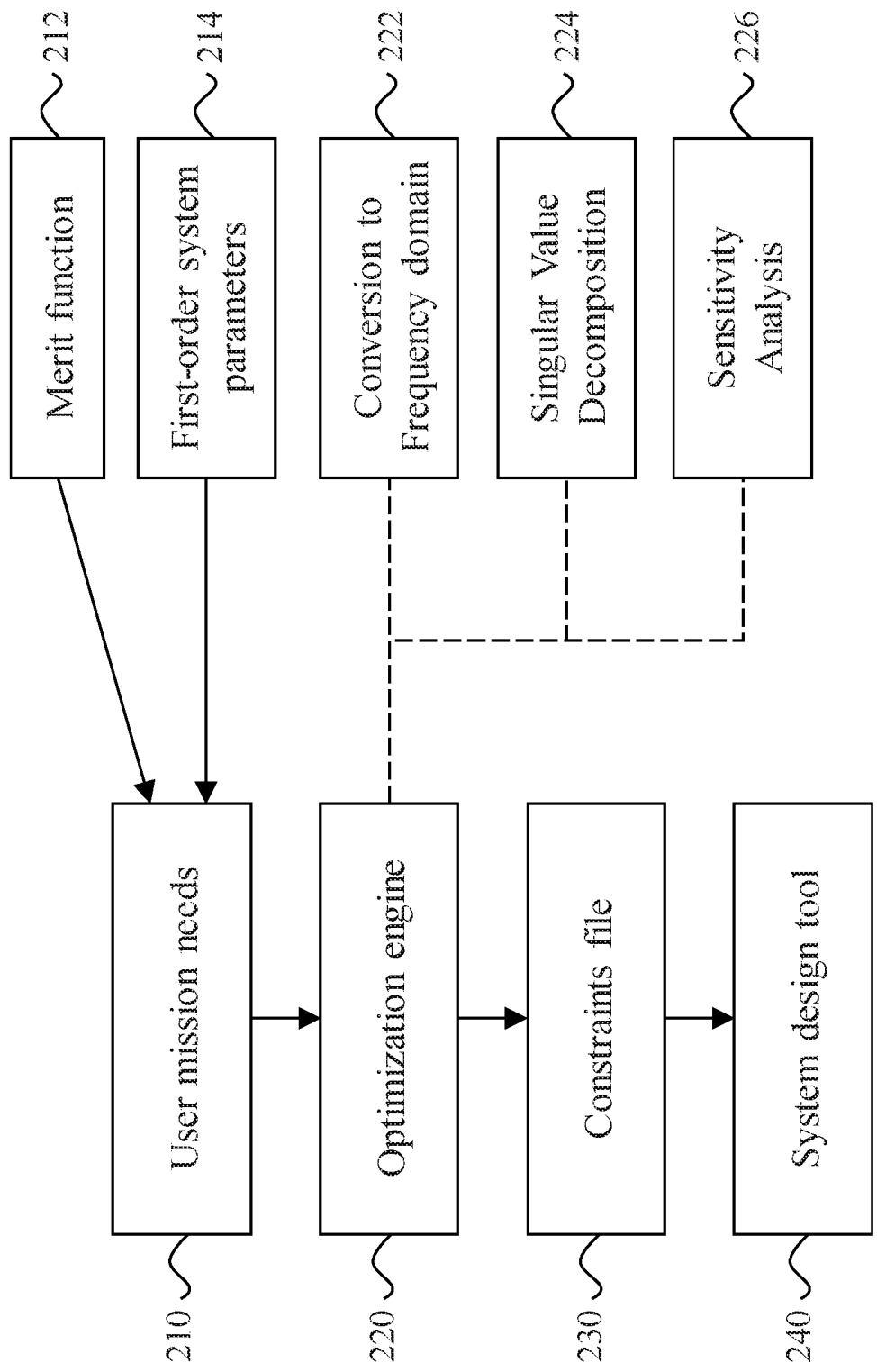
FIG. 2 is a block diagram illustrating an example of the mission-driven design methodology for optical systems, in accordance with embodiments of the disclosed technology.

FIG. 2 is a block diagram illustrating an example of the mission-driven design methodology for an optical or sensor system. As shown in FIG. 2, the mission-driven design methodology is focused on the user mission needs 210, which include a merit function 212 and one or more first-order system parameters 214, as compared to parameters associated with specific components of the optical or sensor system. In an example, a corporation or government agency interested in the development of a space flight imaging system with satellite payloads may have mission objectives in mind, but might not know the specific components needed to achieve one or more of the mission objectives. Embodiments of the disclosed technology are designed to accept the user mission needs 210, which are input into an optimization engine 220 that can implement algorithms or processes that may include, but is not limited to, conversion of a mathematical model (or representation) into the frequency domain 222, a singular value decomposition (SVD) 224 and a sensitivity analysis 226. Using the optimization engine 220, a constraints file 230 can be produced that is input into a design tool 240 (e.g., Code V, Zemax), in order to design the optical or sensor system in a time- and resource-efficient manner.

In some embodiments, the mathematical representation is a map or model of the merit function 212 based on the one or more first-order system parameters 214. It may further be based on parameters associated with components (also referred to as component parameters in this document) of the optical or sensor system. For example, the merit function 212 may be based on the one or more first-order system parameters 214 and the component parameters (e.g., A, B, C, . . . ), or linear or non-linear functions of these parameters (e.g., $A^3$, $\log_{10}B$, $1/C$ . . . ) and one or more constants. The mathematical representation can be a formula relating a dependent variable (the merit function) to one or more independent and dependent variables (the first-order system parameters and the component parameters).

Referring back to the example of the development of the space flight imaging system with satellite payloads, the corporation or government agency (e.g., a search and rescue organization) may be interested in deploying a satellite that can assist in "man overboard" situations, or more specifically, accurately identifying a speck of the color orange (corresponding to a life vest or life preserver) in some portion (e.g., a quarter of a square mile) of the ocean. These mission-level parameters (corresponding to the user mission needs 210) may be used to generate a mathematical mapping that includes, for example, a number of lenses (and their focal lengths, sizes and radii of curvatures) which are then optimized (using the optimization engine 220, which implements, e.g., the SVD 224 and sensitivity analysis 226). The results produced by the optimization engine may indicate, for example, that the focal length of a first lens and the size of a second lens impact the accurate identification of an orange speck in the ocean. Then, these two parameters, instead of all the system parameters, may be included into the constraints file of a design tool (corresponding to the constraints file 230 and the system design tool 240), which can now be used to design the space flight imaging system with satellite payloads.

In some embodiments, the conversion of the mathematical representation (or mapping or model) into the frequency domain 222 may be based on any set of orthogonal (or orthonormal) functions. In an example, the Fourier transform may be used. In another example, a discrete cosine transform (DCT), a Laplace transform or a Z transform may be used.

In some embodiments, other sensitivity analysis methods may be used to determine which parameters should be included into the constraints file. In an example, a variogram-based method (e.g., variogram analysis of response surfaces (VARS)) may be used given the mathematical representation (without transforming it to the frequency-domain). In another example, an emulator based on a machine learning approach may be used to derive a simpler version of the mathematical representation, which is then used to determine which parameters have the greatest impact on the merit function.

Exemplary Embodiment for Imaging System Design

Figure 3:
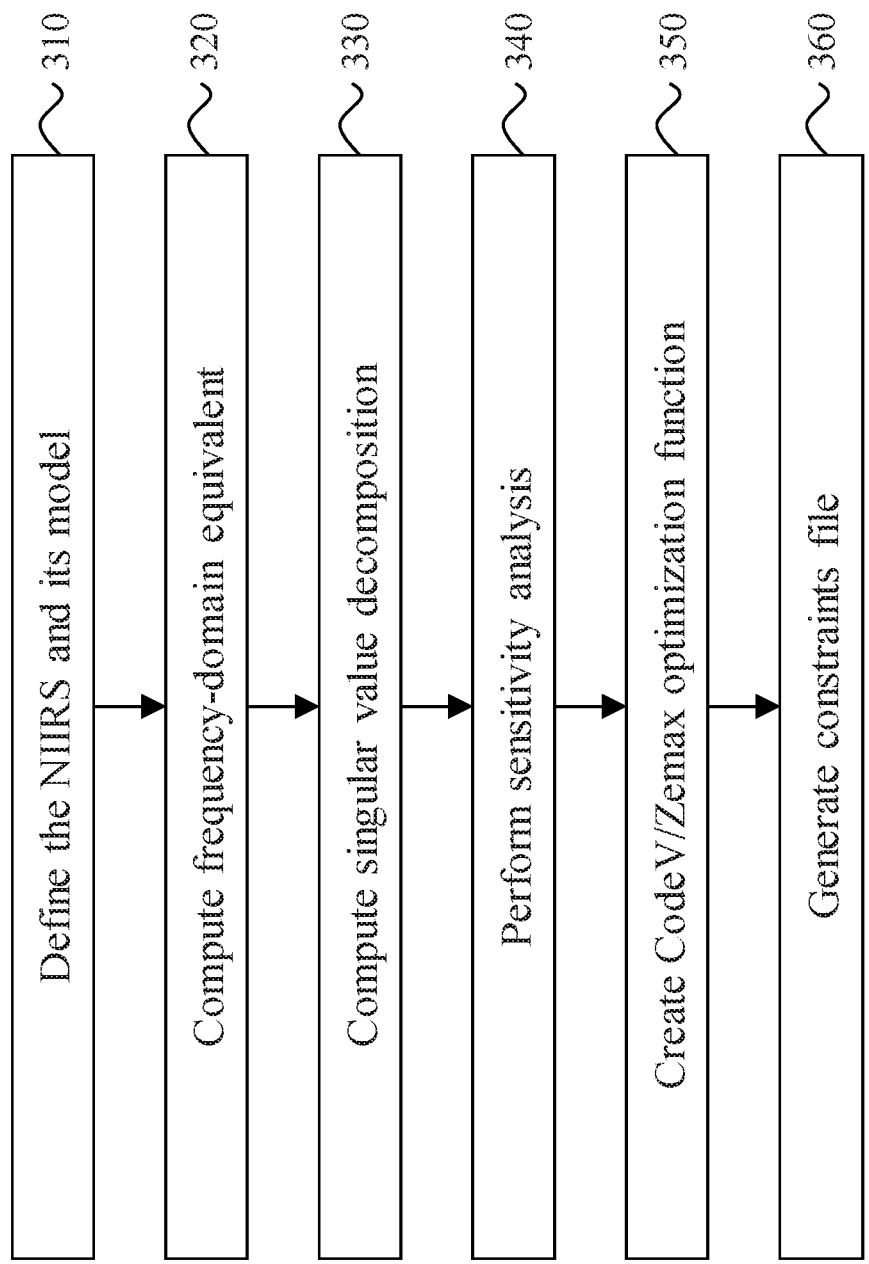
FIG. 3 illustrates a flowchart for an exemplary mission-driven design methodology for an imaging system, in accordance with embodiments of the disclosed technology.

FIG. 3 illustrates a flowchart for an exemplary mission-driven design methodology for an imaging system. At operation 310, the user-centric figure of merit is selected in this example to be the National Image Interoperability Rating Scale (NIIRS), which is a subjective scale used for rating the quality of imagery acquired from various types of imaging systems. The NIIRS defines different levels of image quality/interpretability based on the types of tasks an analyst can perform with images of a given NIIRS rating. The model used for the NIIRS is the General Image Quality Equation (GIQE), which is given by:

$$NIIRS = A_0 + A_1 \log_{10}(GSD) + \\ A_2 \times (1 + \exp(A_3/SNR)) \times \log_{10}(RER) + A_4 \log_{10}(RER) + A_5/SNR. \tag{1}$$

Herein, $A_0$ through $A_5$ are constants, GSD is the Ground Sampled Distance (in inches) that is a measure of scale and resolution of the target as a function of distance from the imaging system, RER is the Relative Edge Response that is the sharpness of an image (i.e., contrast) due to the influence of various system related processes and real-world physical effects, and SNR is the Signal-to-Noise-Ratio. In short, both GSD and RER provide a measure of image quality. The selection of the NIIRS metric and GIQE model further assumes that image detectors measure time-averaged amplitude squared, so phase information is lost (unlike radar), and that Huygens' principle (or the Huygens-Fresnel principle) applies to point sources in the far field for any linear shift-invariant (LSI) system. Huygens' principle states that every point on a wavefront is itself the source of spherical wavelets, and that the sum of these spherical wavelets forms the wavefront.

Further for LSI systems, the spatial-domain relationship:

(Input image)*(System transfer)=(Output image)

can be transformed to the following frequency-domain relationship:

$F$(Input image)×$F$(System transfer)=$F$(Output image).

Herein, F(H) represents the Fourier transform of H, * represents convolution and x represents multiplication. The frequency-domain relationship can be written in a simplified form as I·H=O, wherein I is the input image, H is the frequency-domain system transfer function and O is the output image. Furthermore, the output of an LSI system may be the cascade of multiple system transfer functions, e.g., $I \cdot H_1 \cdot H_2 \cdot H_3 \cdot \ldots = O.$ Herein, $H_i$ represents the i-th system transfer function. This LSI decomposition may be applied to the NIIRS figure of merit described above, wherein the frequency band limits are considered when computing the Fourier transforms.

With regard to the GIQE model used for the NIIRS figure of merit, it may be noted that F(GSD) acts as a binary low-pass filter up to a spatial frequency defined by f/GSD, F(RER) is a one-dimensional integral of the slope of the convolution of a step function and a point spread function (PSF), which is the system's impulse response, and F(SNR) is also a low-pass filter if a simple Gaussian noise model is considered. It may be further noted that these filters are polychromatic, so they can be extended to any arbitrary set of wavelength bands $(\lambda_1, \lambda_2, \ldots, \lambda_N)$, without a loss of generality.

In some embodiments, the cascade of multiple system transfer functions, $H_1 \cdot H_2 \cdot H_3 \cdot \ldots$ can be replaced with the empirical forms of these filters, represented as H (merely a notational simplification) and its singular value decomposition computed as:

$$H=UWV' \tag{2}$$

Herein, H can be real or complex, U and V are orthonormal, U includes eigenvectors of $(HH^T)$, V includes eigenvectors of $(H^TH)$, $X^T$ is the transpose of matrix X, and W is ordered strictly decreasingly on its main diagonal with its entries being representative of each combination of U and V. In some embodiments, the entries of W may be compared to a threshold. In an example, the threshold may be determined by the precision of the machine on which these computations and optimizations are performed.

In order to determine which variables more strongly impact the figure of merit, the entries of W can be compared to a threshold and a sensitivity analysis performed with the rows of V that correspond to the non-zero entries in W to determine whether they change as a response to the inputs.

In some embodiments, and to specifically test the mapping of user metrics to optical design constraints, changes to the input filters may be implemented, and at least the following can be checked: (i) do the relative magnitudes of V change, and (ii) is there a substantial change in the value of W. This approach is based on the fact that the SVD is a generalized spectral transform, wherein U is the spanning set of the domain of the linear system and V' is the spanning set of the range of the linear system. Based on the sensitivity analysis performed, the corresponding set of $U_1, U_2, \ldots$ is the domain that corresponds to the sensitive portion of the user-defined metrics. This may be followed by the creation of the optimization function of the design tool, and the significantly non-zero valued items in the first few columns of U, i.e., $U_1, U_2, \ldots$, can be identified. These non-zero valued items correspond to the items that are written to the constraint file, and the remainder of the entries of U may be ignored.

Exemplary Embodiment for Optical System Design

Figure 4:
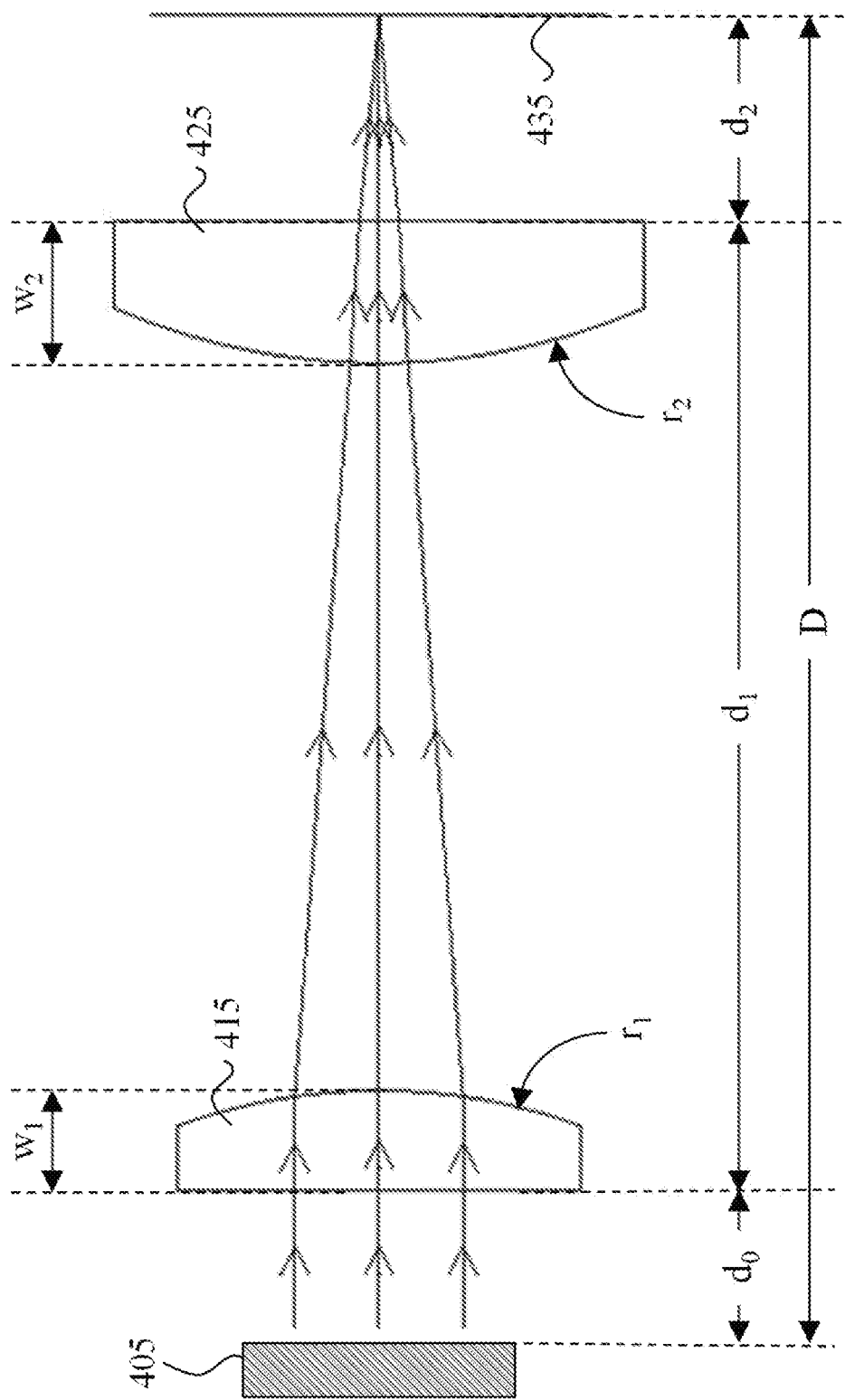
FIG. 4 illustrates an exemplary optical system for imaging and/or illumination, which can be optimized in accordance with embodiments of the disclosed technology.

FIG. 4 illustrates an exemplary optical system for imaging and/or illumination. As shown in FIG. 4, the optical system includes a light source 405, a first lens 415, a second lens 425 and a target plane 435. In this example, the mission-driven parameters may include (i) the distance between the source 405 and the target plane 435 (denoted "D" in FIG. 4) and (ii) a field of view of the optical system, and the figure of merit may be the illumination of the target plane 435. In the context of FIG. 2, these mission-driven parameters and the figure of merit are input into the optimization engine that generates a mapping between the figure of merit and (i) the mission-driven parameters, as well as (ii) parameters of the components of the optical system.

As shown in FIG. 4, the parameters of the components of the optical system include the distance between the light source 405 and the first lens 415 (denoted $d_0$), the distance between the first lens 415 and the second lens 425 (denoted $d_1$) and the distance between the second lens 425 and the target plane 435 (denoted $d_2$). The parameters further include the thickness and radius of curvature of the first lens 415 (denoted $w_1$ and $r_1$, respectively) and the thickness and radius of curvature of the second lens 425 (denoted $w_2$ and $r_2$, respectively). As further seen in FIG. 4, the mapping used by the optimization engine will include the relationship $d_0+d_1+d_2=D$. In one exemplary set of operations, the optimization engine transforms the mathematical representation into the frequency-domain, computes the SVD of the frequency-domain representation, and performs a sensitivity analysis to determine which of the parameters have the greatest impact on the figure of merit, similar to the process described in the context of FIG. 3. As described earlier, and in an example, the sensitivity analysis may include methodically varying the input parameters and determining the change in the figure of merit. In another example, computing the SVD generates eigenvalues associated with each of the parameters, and the magnitude of the eigenvalues may be used to determine which parameters have a significant or minimal impact on the figure of merit. One or more parameters that have the greatest impact on the figure of merit are selected, and then included into a constraints file, which is used by a design tool (e.g., Code V, Zemax) to design the imaging and/or illumination optical system.

Figure 5:
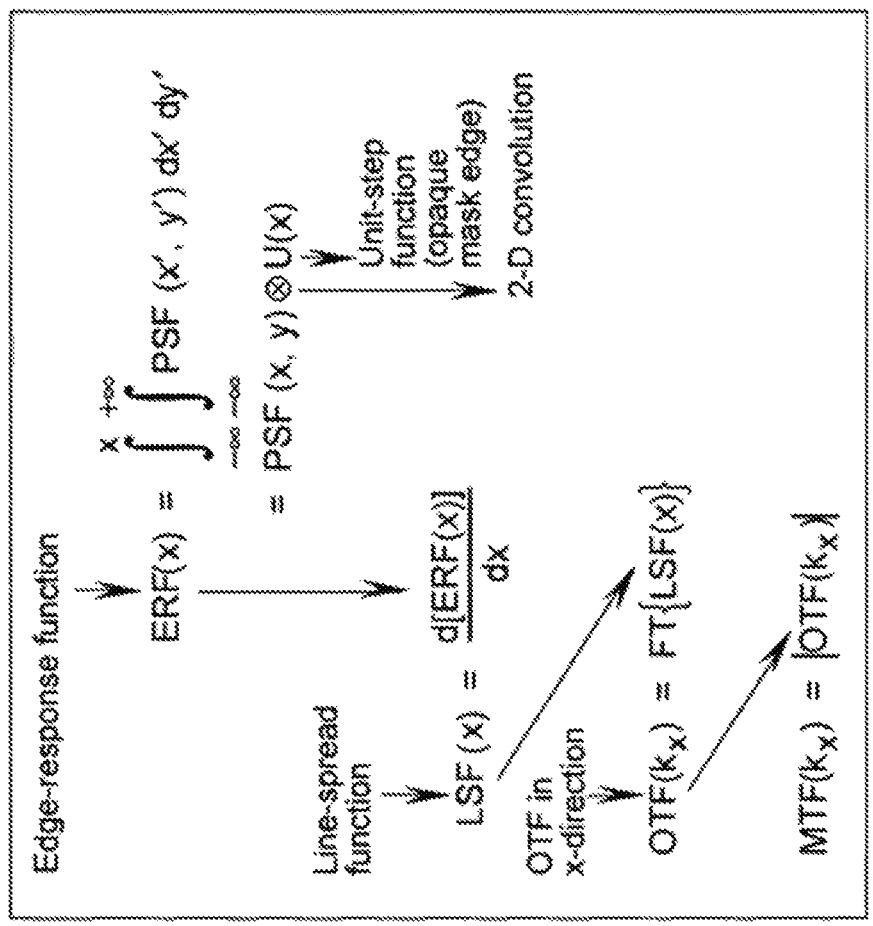
FIG. 5 illustrates, for an exemplary embodiment of the disclosed technology, the mathematical steps required to transform an edge-response function (ERF) into a modulation transfer function (MTF).

FIG. 5 illustrates, for an exemplary embodiment of the disclosed technology, the mathematical steps required to transform an edge-response function (ERF) into a modulation transfer function (MTF). The MTF is derived from a point spread function (PSF), that describes the response of an imaging system to a point source or a point object, and may be interpreted as the impulse response of the imaging system.

As illustrated in FIG. 5, the edge-response function (ERF) is defined as the two-dimensional convolution of the PSF with a unit-step function (e.g., an opaque mask edge), a line-spread function (LSF) is the derivative (in a spatial-domain direction) of the ERF, typically computed as a numerical approximation based on finite differences, the Fourier transform of the LSF (in a spatial-domain direction) is the optical transfer function (OTF) (in that spatial-domain direction), and the magnitude of the OTF is the required modulation transfer function (MTF).

The mathematical steps illustrated in FIG. 5 are exemplary of linear shift-invariant (LSI) systems, and are used to demonstrate an example of the efficacy of embodiments of the disclosed technology. In particular, the determination of system-level parameters that affect optical design for an NIIRS-optimized system.

FIG. 6 is an example of a pre-computed table of optical transfer functions (OTFs) corresponding to an NIIRS system, which includes individual OTFs as well as combinations of OTFS, and are designated as:
Optical OTF (602 in FIG. 6)
Pixel OTF (604 in FIG. 6)
Velocity smear OTF (606 in FIG. 6)
ADCS jitter OTF (608 in FIG. 6)
Optical+Pixel OTF (612 in FIG. 6)
Optical+Pixel+Velocity smear OTF (614 in FIG. 6)
Optical+Pixel+ADCS jitter OTF (616 in FIG. 6)
Optical+Pixel+Velocity smear+ADCS jitter OTF (not illustrated in FIG. 6)

Figure 7A:
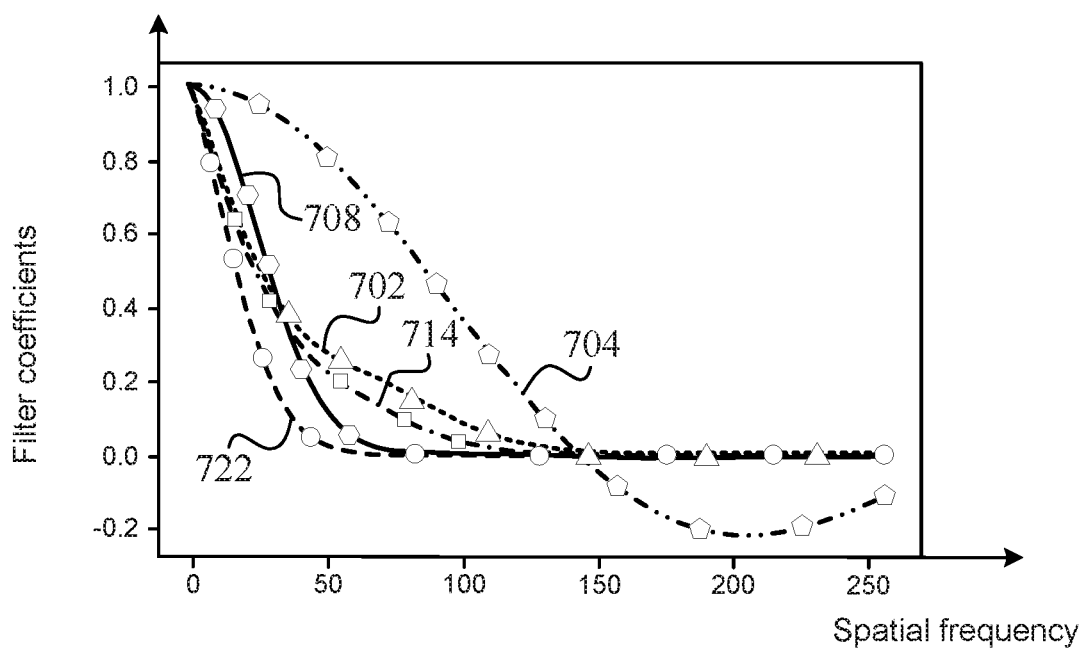
FIG. 7A is a plot of the exemplary OTFs tabulated in FIG. 6.

FIG. 7A plots the individual and combination OTFs as a function of optical (or angular) frequency. As illustrated there, for example, one curve with pentagon markers (702) plotted in FIG. 7A corresponds to the OTF of a 45 cm Cassegrain telescope that has an effective focal length (EFL) of 5.8 meters and 25% obscuration, and which exhibits the characteristic Cassegrain bump in mid-spatial frequencies. The other curves plotted in FIG. 7A include an OTF of pixels in a focal plane array (704), chosen to have sub-nyquist sampling for better SNR (4.7 micron pixel), an OTF of ADCS jitter impacts (708), a linear combination (714) of the optical OTF, pixel OTF and velocity smear OTF and a linear combination (722) of the optical OTF, pixel OTF, velocity smear OTF and ADCS jitter OTF. In some embodiments, the designer does not control any of the platform-related OTFs.

The OTFs may be interpreted as filters whose frequency contributions, as plotted in FIG. 7A, pass through the system with respect to a particular OTF. FIGS. 6 and 7A enumerate exemplary design parameters that an optical system designer must consider and tradeoff in order to obtain the optimal NIIRS value. It is typically not obvious, upon inspection, what the optimal values for the aperture size, obscuration, pixel sampling or EFL should be, and whether the system is most affected by the choice of platform or focal plane array (FPA). Embodiments of the disclosed technology, among other features and benefits, enable a systematic comparison of the relative effect of various design parameters that may affect an optical system.

In this example, nominal values (as shown in Table 1) may be selected for the parameters in Equation (1), which can be used to compute a predicted NIIRS of 5.46467, which is a function of the frequency content that is passed through the system of cascaded OTFs.

TABLE 1

Nominal values for NIIRS computation

| GSD (m) | H (m) | SNR (dB) | RER | A0 |
|---|---|---|---|---|
| 5 | 500,000 | 50 | 0.41 | 9.57 |

| A1 | A2 | A3 | A4 | A5 |
|---|---|---|---|---|
| −3.32 | 3.32 | −1.9 | −2.0 | −1.8 |

Figure 7B:
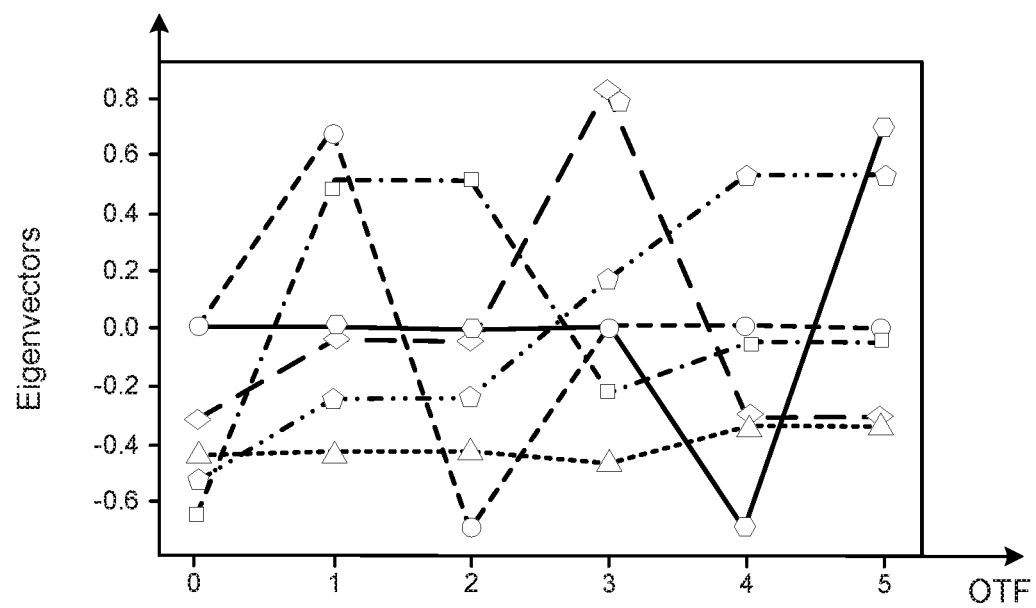
FIG. 7B is a plot of the eigenvectors of the exemplary OTFs tabulated in FIG. 6.
Figure 8A:
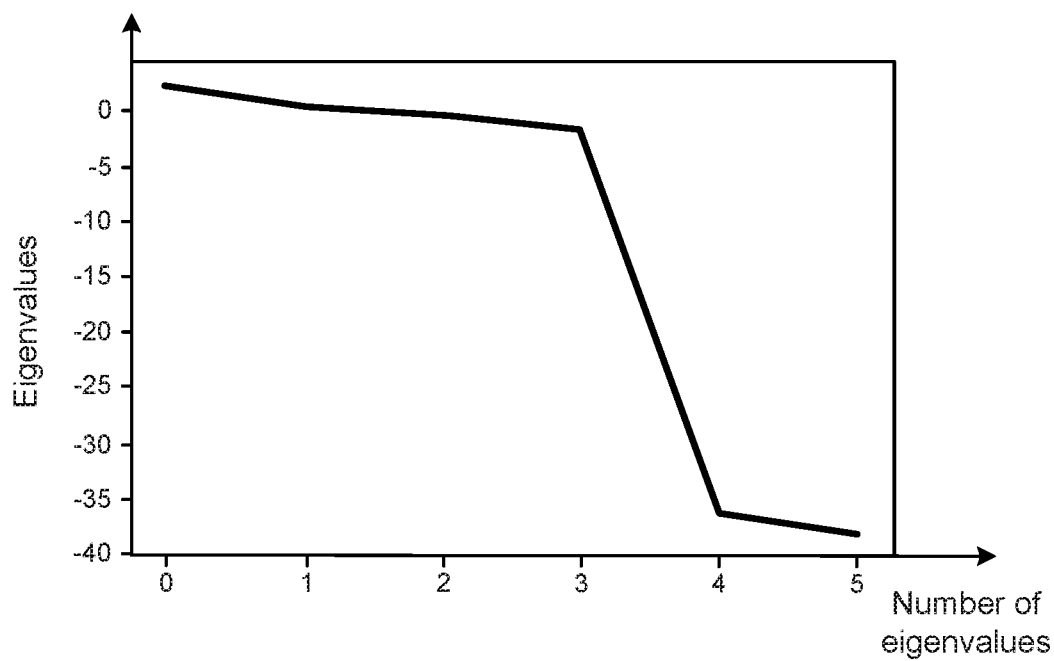
FIG. 8A is an exemplary plot of a combination of one or more OTFs.
Figure 8B:
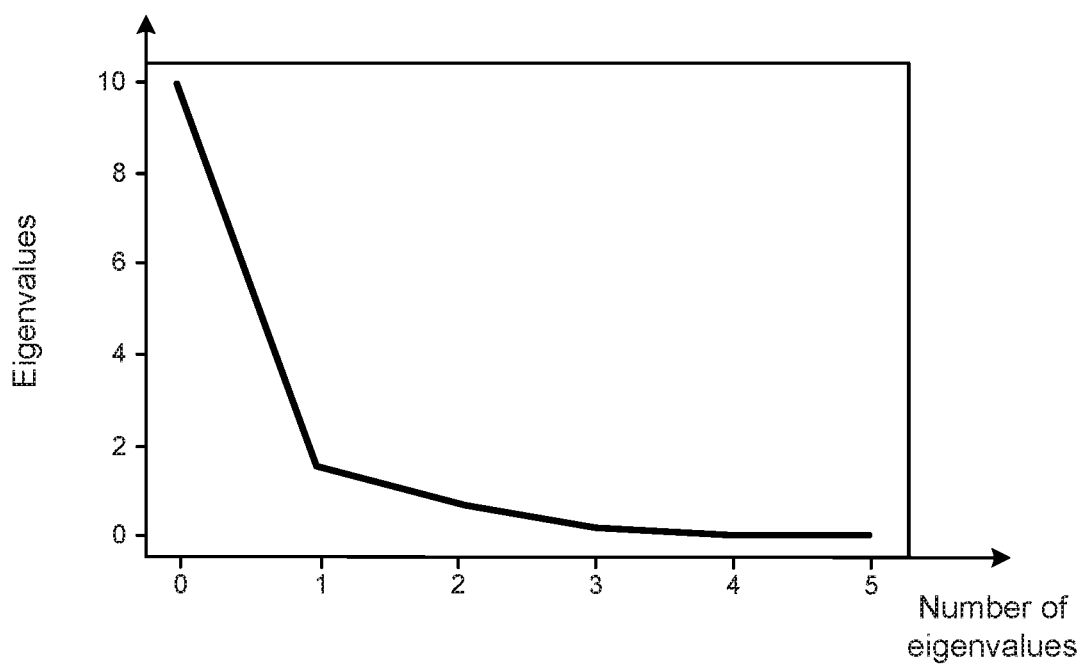
FIG. 8B is another exemplary plot of a combination of one or more OTFs.
Figure 8C:
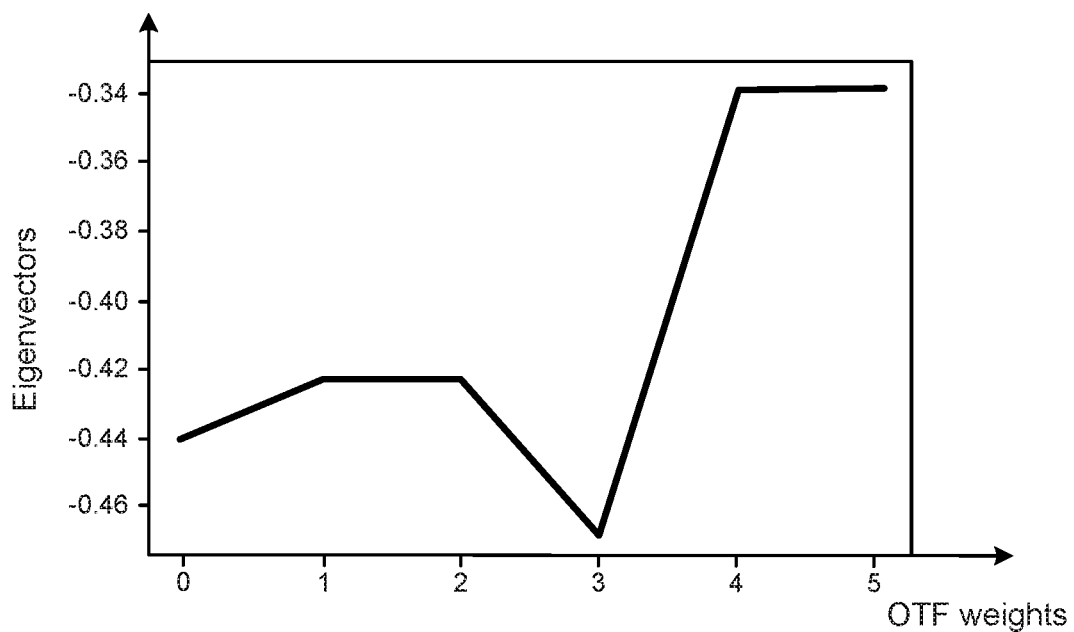
FIG. 8C is yet another exemplary plot of a combination of one or more OTFs.
Figure 8D:
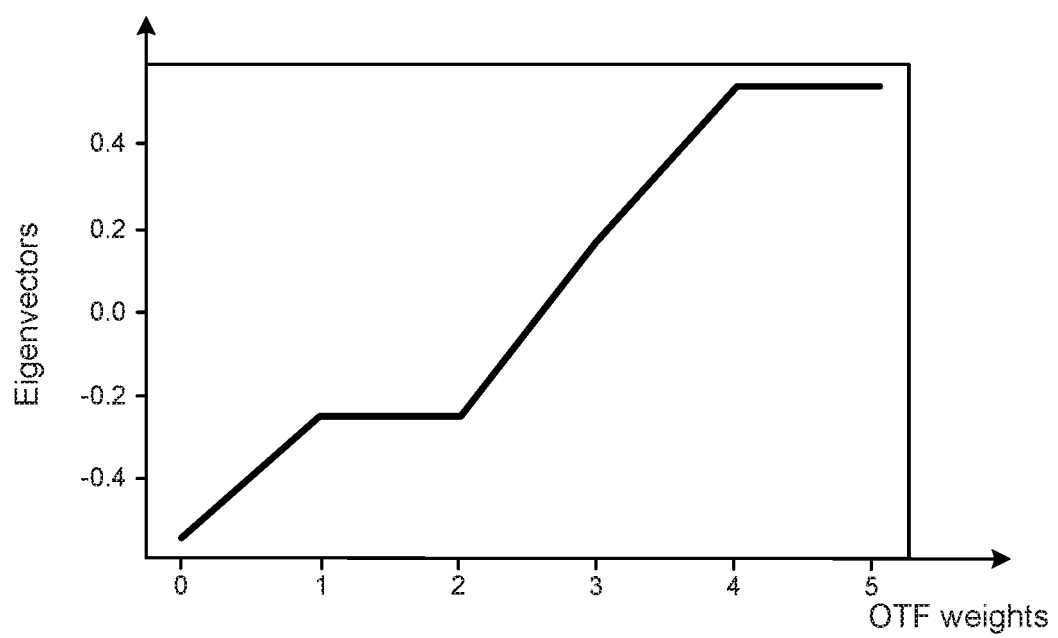
FIG. 8D is yet another exemplary plot of a combination of one or more OTFs.
Figure 8E:
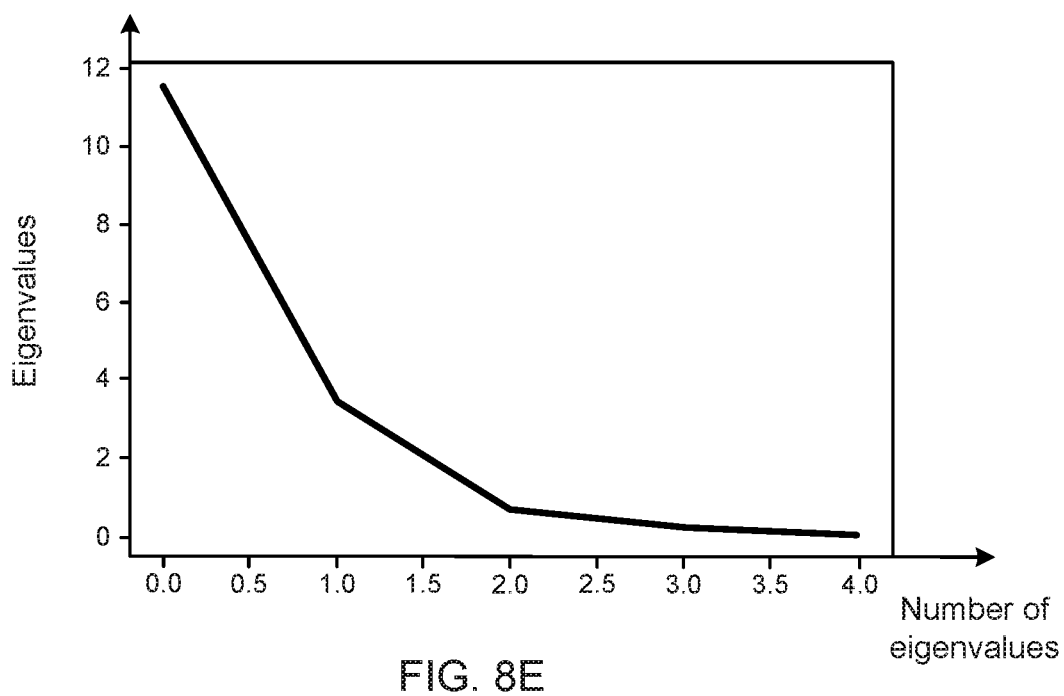
FIG. 8E is yet another exemplary plot of a combination of one or more OTFs.
Figure 8F:
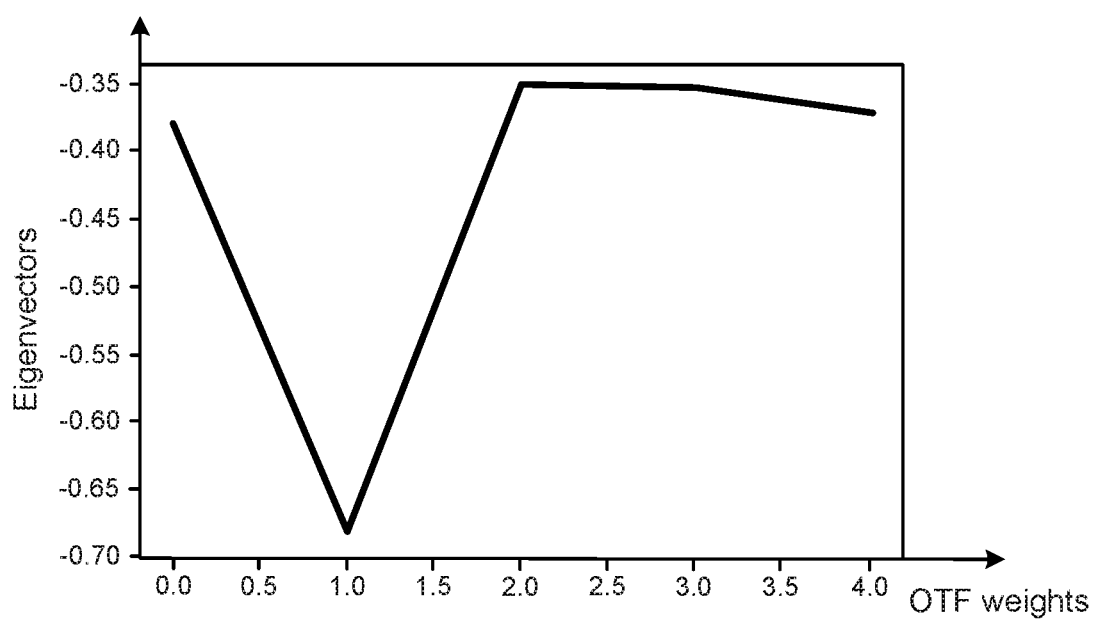
FIG. 8F is yet another exemplary plot of a combination of one or more OTFs.
Figure 8G:
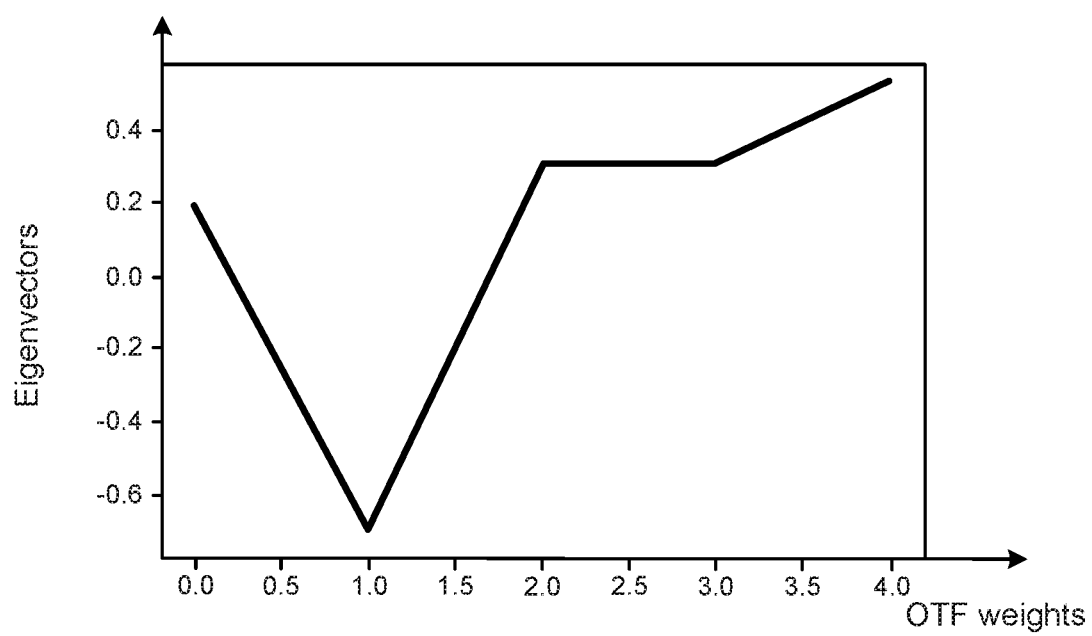
FIG. 8G is yet another exemplary plot of a combination of one or more OTFs.
Figure 8H:
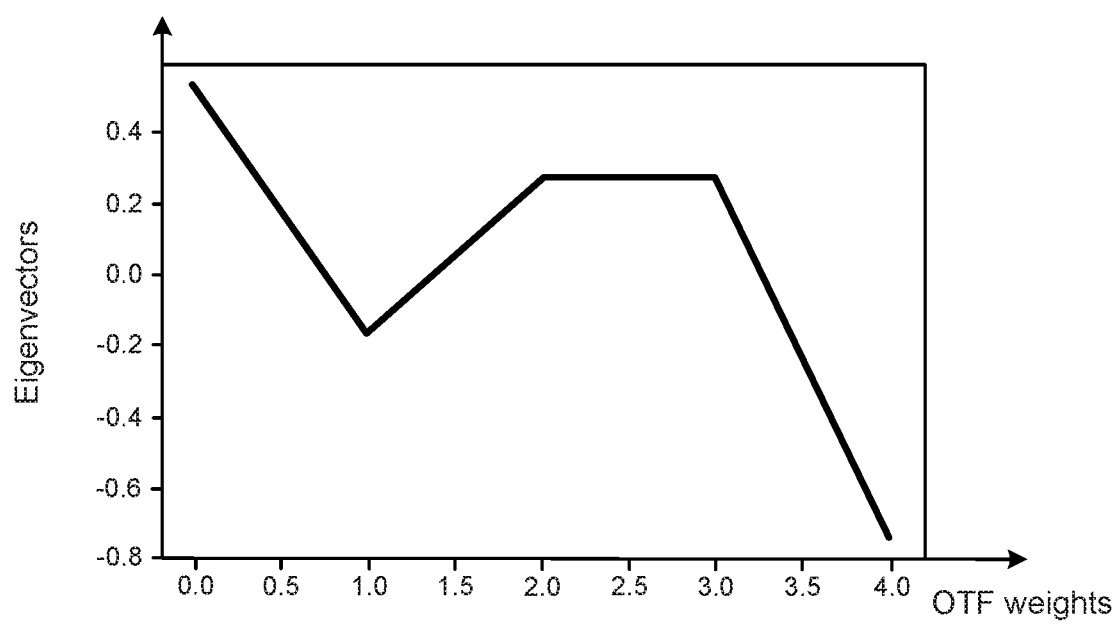
FIG. 8H is yet another exemplary plot of a combination of one or more OTFs.

As described in this document, the SVD of the composite filter response can be computed, and the eigenvectors of the resulting covariance matrix (for component OTFs as well as linear combinations of OTFs) are plotted in FIG. 7B. Specifically, FIG. 7B illustrates plots of log V', where V' includes eigenvectors of the covariance matrix W in the SVD of Equation (2), which illustrate the relative contribution of each OTF.

In order to determine the relative effect of the component OTFs on the system response, the contribution of linear combinations of one or more filters is plotted in FIG. 8A through FIG. 8H, as a function of the number of eigenvalues (e.g., FIGS. 8A, 8B and 8E) and as a function of the OTF weights (e.g., FIGS. 8C, 8D and 8F-8H). The y-axis magnitude (and not the sign, which is arbitrarily chosen in iterative SVD computation) of the plots in each of FIGS. 8A-8H are reflective of the relative contribution of the OTFs to the overall system response.

Specifically, the plots illustrate that in this example, the system is platform limited. That is, the system is not aperture limited, not obscuration limited and the Nyquist mismatch between the telescope OTF and the detection is not limiting either (based on FIGS. 8A-8D).

Thus, the methodology described in the present document, and the exemplary case illustrated in FIGS. 5-8, advantageously enable an optical system designer to iteratively test the relative importance of system parameters for a user-design function (e.g., the NIIRS value). The component effects are examined in a common orthogonal basis via the SVD to determine which ones are driving the system performance.

In some embodiments, the design parameters within a specific component OTF may be tested using the described methodology. For example, the SVD comparisons may be run for different parameters to gauge their effects on the system performance (e.g., 20% vs 25% obscuration, EFL at 5.8 m vs 5.0 m, 45 cm aperture vs 35 cm aperture, and so on).

For both the overall design parameters, as well as the design parameters within a component OTF, first-order design constraints may be derived and input into a computer-aided design tool (e.g., CodeV or Zemax) to improve the efficacy of the design process.

Figure 9:
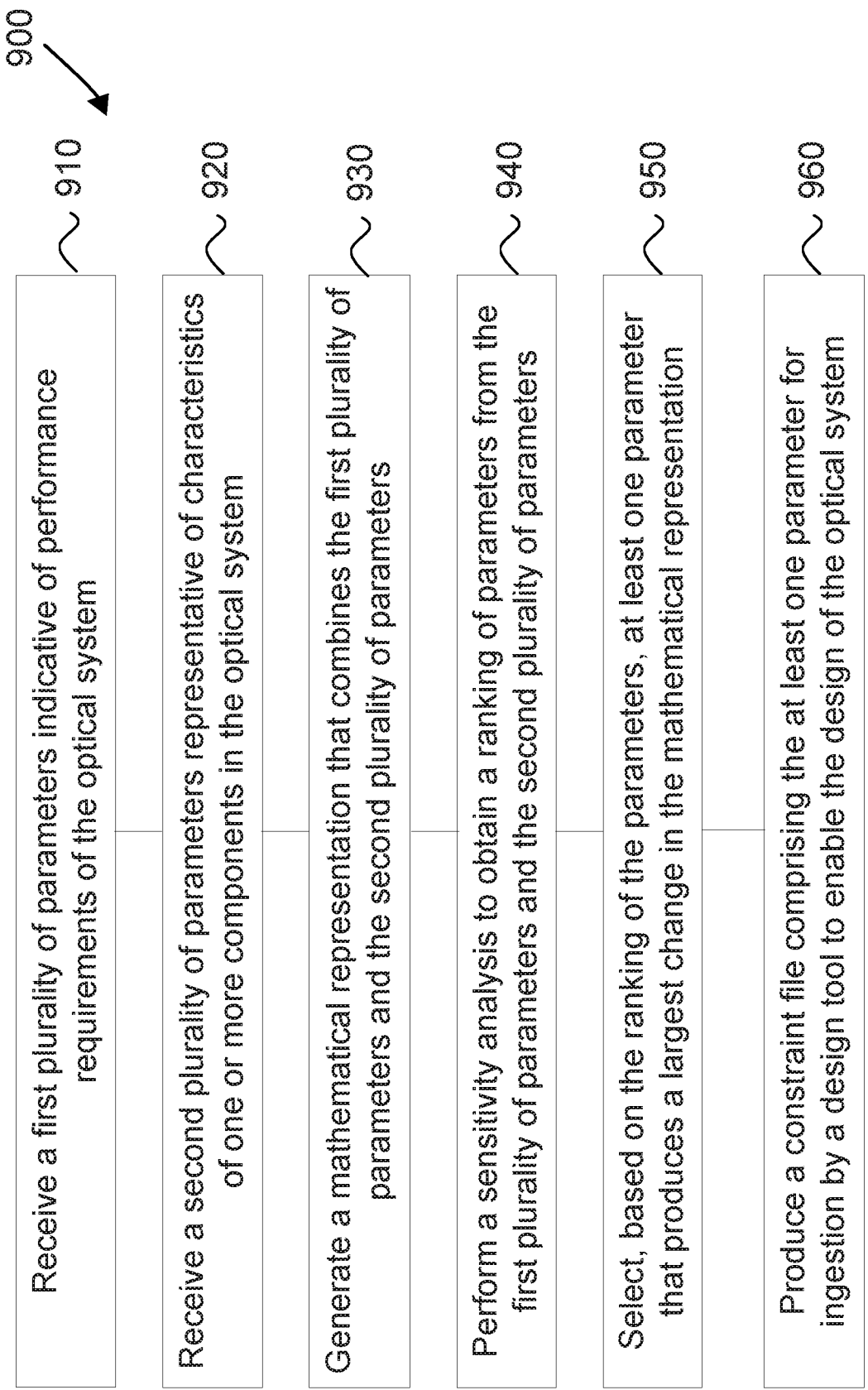
FIG. 9 illustrates a flowchart of an example for performing the mission-driven design methodology for optical systems, in accordance with embodiments of the disclosed technology.

FIG. 9 illustrates a flowchart of an exemplary method for performing the mission-driven design methodology for optical systems. The method 900 includes, at operation 910, receive a first plurality of parameters indicative of performance requirements of the optical system. In some embodiments, the first plurality of parameters include "mission-driven" parameters, which are typically parameters that focus on the high-level requirements or outcomes of the mission. In the example of the search and rescue organization described earlier, the portion of the ocean to be searched in a single image (e.g., a quarter of a square mile) is an example of a mission-driven parameter.

The method 900 includes, at operation 920, receive a second plurality of parameters representative of characteristics of one or more components in the optical system. In some embodiments, the second plurality of parameters include parameters associated with specific components of the optical system being designed, such as the thickness and radius of curvature of one or more lenses that are used in the design, or the distance from a light source of the optical system to a target plane.

The method 900 includes, at operation 930, generate a mathematical representation that combines the first plurality of parameters and the second plurality of parameters. In some embodiments, the mathematical representation is a map or model of the concrete requirements of the optical system being designed. That is, linear and/or non-linear functions of both mission-driven and component parameters are part of the functional relationship that connect the mission objectives to the specific implementation that can achieve that objective.

The method 900 includes, at operation 940, perform a sensitivity analysis to obtain a ranking of parameters from the first plurality of parameters and the second plurality of parameters, where a change in a parameter with a higher rank produces a larger change in the mathematical representation than a parameter with a lower rank.

In some embodiments, the method 900 may further include, as part of performing the sensitivity analysis, the operations of generating a frequency-domain representation of the mathematical representation, and computing singular value decomposition of the frequency-domain representation. In an example, generating the frequency-domain representation is based on one of a Fourier transform, a discrete cosine transform (DCT), a Laplace transform or a Z-transform, or more generally, any orthogonal basis set of functions.

In some embodiments, computing the singular value decomposition produces a plurality of eigenvalues, and the ranking of parameters is based on magnitudes of the plurality of eigenvalues.

The method 900 includes, at operation 950, select, based on the ranking of the parameters, at least one parameter that produces a largest change in the mathematical representation.

The method 900 includes, at operation 960, produce a constraint file comprising the at least one parameter selected at operation 950 for ingestion by a design tool to enable the design of the optical system.

In some embodiments, combining the first plurality of parameters and the second plurality of parameters comprises combining linear or non-linear functions of the first plurality of parameters and linear or non-linear functions of the second plurality of parameters.

In some embodiments, the mathematical representation is a National Image Interpretability Rating Scale (NIIRS) based on a General Image Quality Equation (GIQE), as described in the context of FIG. 3. In an example, the first plurality of parameters includes the Signal-to-Noise Ratio (SNR). In another example, the second plurality of parameters includes a Ground Sampled Distance (GSD) and/or a Relative Edge Response (RER).

Figure 10:
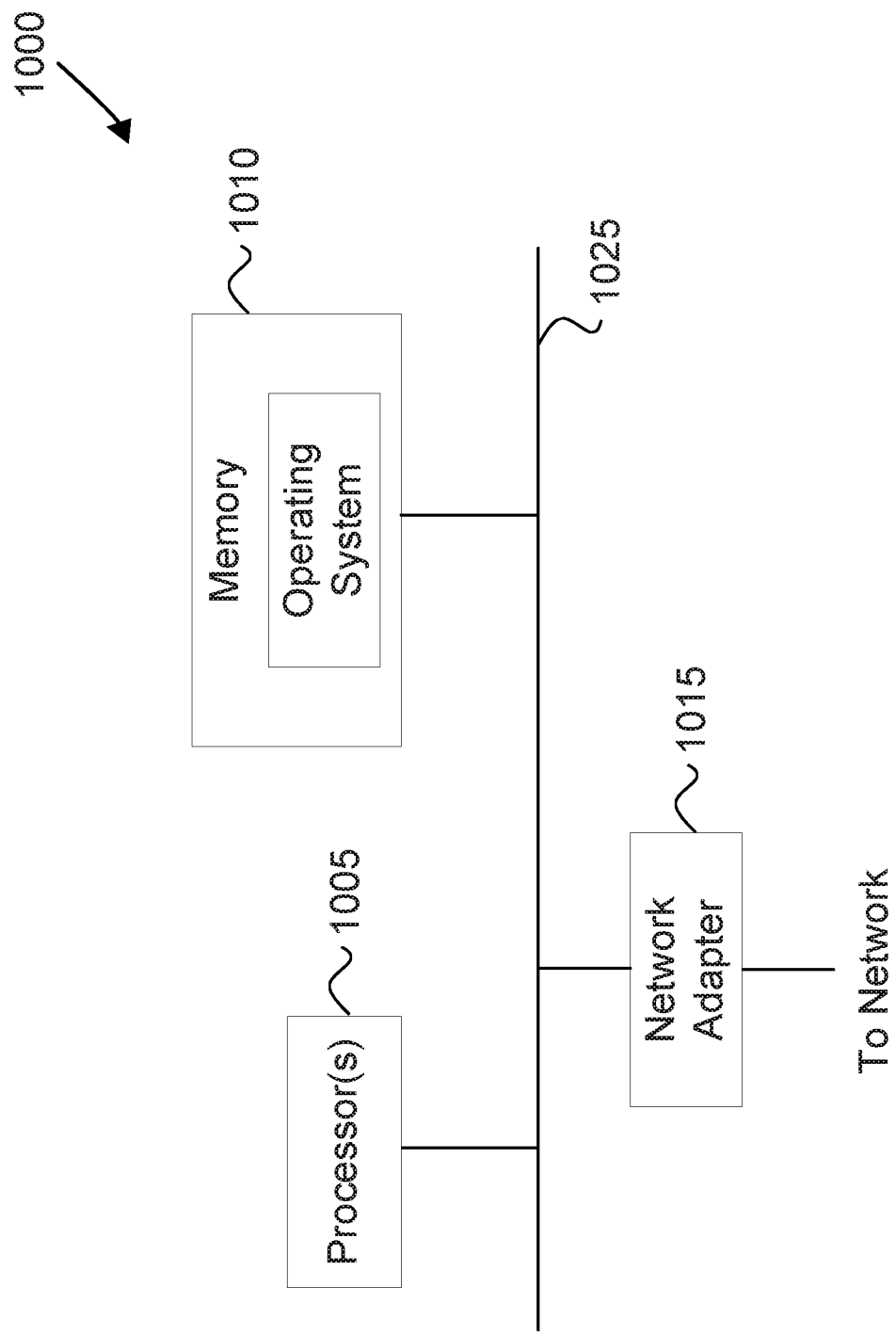
FIG. 10 is a block diagram illustrating an example of the architecture for a computer system or other control device that can be utilized to implement various portions of the presently disclosed technology.

FIG. 10 is a block diagram illustrating an example of the architecture for a computer system or other control device 1000 that can be utilized to implement various methods and portions of the presently disclosed technology. In FIG. 10, the computer system 1000 includes one or more processors 1005 and memory 1010 connected via an interconnect 1025. The interconnect 1025 may represent any one or more separate physical buses, point to point connections, or both, connected by appropriate bridges, adapters, or controllers. The interconnect 1025, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1005 may include one or more central processing units (CPUs) to control the overall operation of, for example, the host computer. In certain embodiments, the processor(s) 1005 accomplish this by executing software or firmware stored in memory 1010. The processor(s) 1005 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1010 can be or include the main memory of the computer system. The memory 1010 represents any suitable form of random access memory (RAM), read-only memory (ROM), flash memory, or the like, or a combination of such devices. In use, the memory 1010 may contain, among other things, a set of machine instructions which, when executed by processor 1005, causes the processor 1005 to perform operations to implement embodiments of the presently disclosed technology.

Also connected to the processor(s) 1005 through the interconnect 1025 is a (optional) network adapter 1015. The network adapter 1015 provides the computer system 1000 with the ability to communicate with remote devices, such as the storage clients, and/or other storage servers, and may be, for example, an Ethernet adapter or Fiber Channel adapter.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of these. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An apparatus for improving a design of an optical system associated with a mission, the apparatus comprising:
    at least one processor; and
    a non-transitory memory with instructions stored thereon, the instructions upon execution by the at least one processor, causing the at least one processor to:
        receive a figure of merit indicative of a performance of the optical system;
        receive a first plurality of parameters indicative of mission-driven requirements of the optical system, wherein the mission-driven requirements comprise an outcome of the mission;
        receive a second plurality of parameters representative of characteristics of one or more components in the optical system, wherein the second plurality of parameters comprises a plurality of optical transfer functions (OTFs) that includes a first OTF corresponding to a first component of the optical system, a second OTF corresponding to a second component of the optical system, and a third OTF corresponding to at least a linear combination of at least the first OTF and the second OTF;
        generate a mathematical representation for the figure of merit that combines the first plurality of parameters and the second plurality of parameters;
        perform a sensitivity analysis to obtain a ranking of parameters from the first plurality of parameters and the second plurality of parameters, wherein a change in a parameter with a higher rank produces a larger change in the mathematical representation than a parameter with a lower rank, wherein the sensitivity analysis is based on a singular value decomposition of a frequency-domain representation of the mathematical representation, and wherein the singular value decomposition produces a plurality of eigenvalues whose magnitudes correspond to the ranking of the parameters;

select, based on comparing the magnitudes of the plurality of eigenvalues to a threshold, at least one parameter that produces a largest change in the mathematical representation, wherein the threshold is based on at least a precision of the at least one processor; and produce a constraint file comprising the at least one parameter for ingestion by a design tool to enable the design of the optical system.

2. The apparatus of claim 1, wherein the frequency-domain representation is based on one of a Fourier transform, a discrete cosine transform (DCT), a Laplace transform or a Z-transform.

3. The apparatus of claim 1, wherein combining the first plurality of parameters and the second plurality of parameters comprises combining linear or non-linear functions of the first plurality of parameters and linear or non-linear functions of the second plurality of parameters.

4. The apparatus of claim 1, wherein the mathematical representation is a National Image Interpretability Rating Scale (NIIRS) based on a General Image Quality Equation (GIQE).

5. The apparatus of claim 4, wherein the second plurality of parameters comprises a Ground Sampled Distance (GSD) and a Relative Edge Response (RER).

6. A method for improving a design of an optical system associated with a mission, the method being implemented on a processor, the method comprising:

receiving a figure of merit indicative of a performance of the optical system;

receiving a first plurality of parameters indicative of mission-driven requirements of the optical system, wherein the mission-driven requirements comprise an outcome of the mission;

receiving a second plurality of parameters representative of characteristics of one or more components in the optical system, wherein the second plurality of parameters comprises a plurality of optical transfer functions (OTFs) that includes a first OTF corresponding to a first component of the optical system, a second OTF corresponding to a second component of the optical system, and a third OTF corresponding to at least a linear combination of at least the first OTF and the second OTF;

generating a mathematical representation for the figure of merit that combines the first plurality of parameters and the second plurality of parameters;

performing a sensitivity analysis to obtain a ranking of parameters from the first plurality of parameters and the second plurality of parameters, wherein a change in a parameter with a higher rank produces a larger change in the mathematical representation than a parameter with a lower rank, wherein the sensitivity analysis is based on a singular value decomposition of a frequency-domain representation of the mathematical representation, and wherein the singular value decomposition produces a plurality of eigenvalues whose magnitudes correspond to the ranking of the parameters;

selecting, based on comparing the magnitudes of the plurality of eigenvalues to a threshold, at least one parameter that produces a largest change in the mathematical representation, wherein the threshold is based on at least a precision of the processor; and producing a constraint file comprising the at least one parameter for ingestion by a design tool to enable the design of the optical system.

7. The method of claim 6, wherein frequency-domain representation is based on one of a Fourier transform, a discrete cosine transform (DCT), a Laplace transform or a Z-transform.

8. The method of claim 6, wherein combining the first plurality of parameters and the second plurality of parameters comprises combining linear or non-linear functions of the first plurality of parameters and linear or non-linear functions of the second plurality of parameters.

9. The method of claim 6, wherein the mathematical representation is a National Image Interpretability Rating Scale (NIIRS) based on a General Image Quality Equation (GIQE).

10. The method of claim 9, wherein the second plurality of parameters comprises a Ground Sampled Distance (GSD) and a Relative Edge Response (RER).

11. A non-transitory computer readable program storage medium having code stored thereon, the code, when executed by a processor, causing the processor to implement a method for improving a design of an optical system associated with a mission, the method comprising:

receiving a figure of merit indicative of a performance of the optical system;

receiving a first plurality of parameters indicative of mission-driven requirements of the optical system, wherein the mission-driven requirements comprise an outcome of the mission;

receiving a second plurality of parameters representative of characteristics of one or more components in the optical system, wherein the second plurality of parameters comprises a plurality of optical transfer functions (OTFs) that includes a first OTF corresponding to a first component of the optical system, a second OTF corresponding to a second component of the optical system, and a third OTF corresponding to a linear combination of at least the first OTF and the second OTF;

generating a mathematical representation for the figure of merit that combines the first plurality of parameters and the second plurality of parameters;

performing a sensitivity analysis to obtain a ranking of parameters from the first plurality of parameters and the second plurality of parameters, wherein a change in a parameter with a higher rank produces a larger change in the mathematical representation than a parameter with a lower rank, wherein the sensitivity analysis is based on a singular value decomposition of a frequency-domain representation of the mathematical representation, and wherein the singular value decomposition produces a plurality of eigenvalues whose magnitudes correspond to the ranking of the parameters;

selecting, based on comparing the magnitudes of the plurality of eigenvalues to a threshold, at least one parameter that produces a largest change in the mathematical representation, wherein the threshold is based on at least a precision of the processor; and producing a constraint file comprising the at least one parameter for ingestion by a design tool to enable the design of the optical system.

12. The non-transitory computer readable program storage medium of claim 11, wherein the frequency-domain representation is based on one of a Fourier transform, a discrete cosine transform (DCT), a Laplace transform or a Z-transform.

13. The non-transitory computer readable program storage medium of claim 11, wherein combining the first plurality of parameters and the second plurality of parameters comprises combining linear or non-linear functions of the first plurality of parameters and linear or non-linear functions of the second plurality of parameters.

14. The non-transitory computer readable program storage medium of claim 11, wherein the mathematical representation is a National Image Interpretability Rating Scale (NIIRS) based on a General Image Quality Equation (GIQE).

\* \* \* \* \*